United States Patent [19]

Lambertson

[11] Patent Number: 4,633,980
[45] Date of Patent: Jan. 6, 1987

[54] ROTARY MOTION DAMPING MEANS

[76] Inventor: William A. Lambertson, Pine Ridge Family Campground, Otts Shoals Rd. (Rte. 1), Roebuck, S.C. 29376

[21] Appl. No.: 733,627

[22] Filed: May 13, 1985

Related U.S. Application Data

[62] Division of Ser. No. 517,068, Jul. 25, 1983, Pat. No. 4,516,667.

[51] Int. Cl.[4] ............................................. F16D 63/00
[52] U.S. Cl. ........................................ 188/84; 235/93; 74/436; 188/85; 188/82.3; 188/110
[58] Field of Search .................... 188/378, 381, 82.9, 188/82.1, 82.2, 82.3, 82.4, 82.8, 82.84, 166, 82.34, 30, 61, 291, 84, 85, 110, 292; 192/8 R, 45, 43, 51, 7, 116.5; 235/93, 99 A, 99 R; 404/83; 74/436

[56] References Cited

U.S. PATENT DOCUMENTS

| 1,074,362 | 9/1913 | Holst | 74/436 |
| 2,408,179 | 9/1946 | Schuetz et al. | 188/82.9 |
| 2,829,832 | 4/1958 | Henkelman | 235/99 A |
| 3,536,169 | 10/1970 | Arnold | 188/82.9 |
| 3,776,368 | 12/1973 | Brauss | 188/82.9 |
| 3,855,873 | 12/1974 | Fletcher et al. | 74/436 |

Primary Examiner—Bruce H. Stoner, Jr.
Assistant Examiner—Alvin Oberley
Attorney, Agent, or Firm—George J. Brandt, Jr.

[57] ABSTRACT

A damping device is provided for damping momentum in a rotary member to stop it at a desired normally stopped position without any override therefrom, the device including a friction plate moveable against the rotating member at least in the terminal stage of its travel to produce the stopping effect.

2 Claims, 13 Drawing Figures

ROTARY MOTION DAMPING MEANS

This is a Division of my copending application, Ser. No. 517,068 filed July 25, 1983, now U.S. Pat. No. 4,516,667.

BACKGROUND OF THE INVENTION

Certain mechanical devices include a rotatable component which following a given rotative movement thereof from a normally stopped position, is intended to be returned to said normally stopped position by a suitable means such as a spring, the return travel often being required to be rapidly effected. To absorb such rapid return travel momentum, the rotatable component has in many instances been operatively connected to a damping device such as a fluid operated shock absorber. Such form of momentum damping is not always effective to produce complete stopping of the rotatable component at its normally stopped position so that as a consequence, the rotatable component can override such normally stopped position a distance, return back past said position and continue to oscillate thereabout for a number of cycles before the return spring resonance dissipates and the rotatable member comes to the complete rest at or proximate its normally stopped position. Utilization of this form of shock absorber also has the disadvantages that the shock absorber requires frequent adjustment to compensate for wear, its proper operation can be affected by weather conditions and its stroking characteristics, i.e., movement of a piston in a cylinder does not replicate the type of movement momentum it is absorbing, i.e., rotational movement. Further, if movement cycle frequency of the rotatable member is to be recorded and the said member can rotate through arcs of, e.g., 90° at both sides of a normally stopped position datum, it is usually only possible to operate a counter when the member is rotating to one side of said datum and not the other. Further, oscillating movement of the rotatable component in many instances can cause miscounting or erroneous recording of the counter unit.

One form of mechanical device in which the foregoing disadvantages are particularly unsatisfactory is represented by rotatable spring loaded barriers used, for example, in connection with controlling and counting ingress and egress transit of humans to a givent location and also for counting entry of automobiles to a parking facility. Such barriers should be quick acting particularly in return travel operation, as in the case of an automobile counter, so that the barrier is repositioned in normally stopped position to insure that counter actuating presentation thereof is available to meet a succeeding entering vehicle following closely behind a preceeding vehicle which has depressed the barrier. However, such quick acting return movement also should be effectively damped to stop the rotatively returning barrier without override of its normally stopped position to prevent "bounce" which can be annoying to customers and to some extent destructive of the barrier itself when such oscillations occur while in contact with an automobile.

SUMMARY OF THE INVENTION

The present invention relates to an improved damping means for damping the return movement of a rotatable member from a moved position thereof to a normally stopped position to insure that rapid return travel momentum is fully absorbed and the member stopped completely at or closely proximate its normally stopped position without any override therefrom.

In one embodiment, the damping means is employed in association with a rotatable member that is free to be rotated by force applied through an arc of about 90° to either side of its normally stopped position to a moved position and then on release of such force is rapidly rotated in an opposite direction by spring means to return it to the normally stopped position. In accordance with the invention, the rotatable member which is rotatable about a fixed axis, is provided with a friction face that lies in juxtaposition to a like friction face of a co-axially disposed non-rotatable plate member, the plate member being slideable along said fixed axis so that its friction face can be spring biased into good frictional engagement with that of the rotatable member. In the normally stopped position of the rotatable member, the plate member is biased against the rotatable member and the maximum frictional contact therebetween exists. Upon rotative movement of the rotatable member in one direction, camming means carried on the rotatable member engage the plate member and slide it axially away from rotatable member in opposition to a compression spring acting on the plate member and freeing these members of frictional constraint therebetween. When the force applied to the rotatable member to rotate it in said one direction is released, the spring means operatively connected to the rotatable member for such purpose, rotates such member in an opposite direction very rapidly to return it from moved position towards its normally stopped position. During such return travel, the camming means is still operative to keep the friction faces of the rotatable member and plate member out of contact until a certain short distance before the rotatable member reaches its normally stopped position. At said certain distance, the camming means disengages from the plate member and the plate member is forced by the compression spring back into frictional face-to-face contact with the rotatable member. This frictional contact is sufficient to absorb the rotational momentum in the rotatable member and bring it to a complete stop at or closely proximate its normally stopped position without any override therefrom.

The camming means carried on the rotatable member in one form can comprise a cam carried on the circumferential periphery of the rotatable member and extending axially therefrom so as to be engageable with a follower carried on the plate member. In another form, the camming means can be a ball member captively carried in the friction face of the rotatable member. The friction face of the plate member in this instance can be provided with a detent groove in which the ball member is received when the rotatable member is in normally stopped position. The detent groove is blind at both ends so that after the rotatable member is rotated a certain distance from the normally stopped position, the ball rides out of the detent groove into engagement with the face surface as such to urge the plate member out of frictional engagement with the rotatable member.

Preferably, both the rotatable member and the plate member are made of cast iron so as to present cast iron finished frictional face surfaces. The order of finish required for a particular application readily can be determined by those skilled in the art. In an actual embodiment a finish of 63 micro inch provided frictional engagement condition more than ample to effect the desired positive, rapid damping effect.

In another embodiment of the invention and applicable to damping of a rotatable member intended to rotate in stepped travel increments in a given direction of rotation, the same principle of effecting stopping of the rotatable member at a desired normally stopped position at the end of the incremental travel without any override with friction engagement of a rotatable member by a plate member for such purpose is employed. In such embodiment as where a member rotates through, say 360° in three equal stepped increments of travel of 120°, the damping means includes a rotatable disc in constant frictional engagement with a non-rotatable plate, the rotatable disc being connected with a Geneva Drive mechanism and fixed to rotate with a Geneva gear. Actuation of a component moving in stepped increments of, e.g., 120° operates to initiate rotation of the Geneva gear but a drive pin carried on the component soon disengages from a drive slot in the Geneva gear with the result that while the component continous to rotate, the Geneva gear and the rotatable disc fixed therewith come to rest until the rotating device nears the end of its travel increment and a succeedingly disposed pin thereon enters a succeeding drive slot in the Geneva gear reestablishing the frictional contact between the disc and non-rotatable plate to damp the movement of the component and stop it and the rotatable disc in normally stopped position, i.e., 120° from the point of initial rotative movement.

In a further embodiment of damping device, cooperating rotatable and non-rotatable plate members are employed as aforesaid. A shaft which is connected to the member from which rotative movement requiring damping is initiated passes loosely through both the rotatable and non-rotatable plate members. Thus during travel of the member from a normally stopped position to a moved position, the shaft moves freely within both plate members and friction face contact between said plate members has no effect inasmuch as the rotatable plate member remains at rest. However, during the return travel of said member from moved position to normally stopped position, the rotatable plate member through the agency of a clutch becomes coupled to the shaft and is caused to rotate in frictional face-to-face contact against the non-rotatable plate member and thereby effect damping the said return travel of said member. The clutch is a roller type clutch member well known in the art and which engages the shaft on which it is carried with the rotatable plate member in one direction of rotation thereof only. The clutch remains passive when the shaft is rotating in an opposite direction.

The advantages and further features of the invention will be made more apparent from the following detailed description to be given hereinafter and will be described in terms of such features of construction, combination of elements and arrangement of parts as will be exemplified in the construction set forth and the scope of the invention will be indicated in the claims.

BRIEF DESCRIPTION OF THE DRAWINGS

A fuller understanding of the nature and object of the invention will be had from the following detailed description taken in conjuction with the accompanying drawings in which:

FIGS. 4a' and 4b' to depict the condition of frictional engagement of the plate member with the rotatable member, and the separation therebetween when the rotatable member is in moved position.

Throughout the following description, like reference numerals are used to denote like parts in the drawings.

Referring to FIGS. 1 and 2 there is depicted an automobile-counter 10 of the type employed for counting entry of vehicles to a parking facility and representing one type of device in which an embodiment of the damping means of the present invention is used, the said damping means being shown generally at 12. The counter 10 includes an enclosure casing 14 normally situate on the ground of vehicle entry lane and since it is exposed to the elements, desirably is constructed as a waterproof structure to protect the damping means and counter mechanism housed therein. In operation as when a vehicle passes over the counter 10, the barrier arm or wand 16 is rotatively depressed from the normally stopped position thereof shown in solid lines to a moved position as shown in dashed lines and during such movement causes operation of a counter mechanism 18 to record the vehicle passage. When the vehicle has passed beyond counter 10, the barrier arm or wand is rapidly returned to its vertically disposed normally stopped position and it is this return movement that is damped by the damping means 12.

Figure 2:
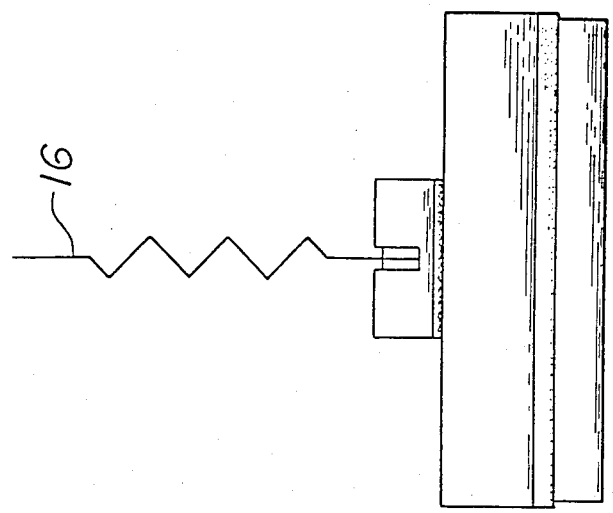
FIG. 2 is an end view of the unit shown in FIG. 1.
Figure 1:
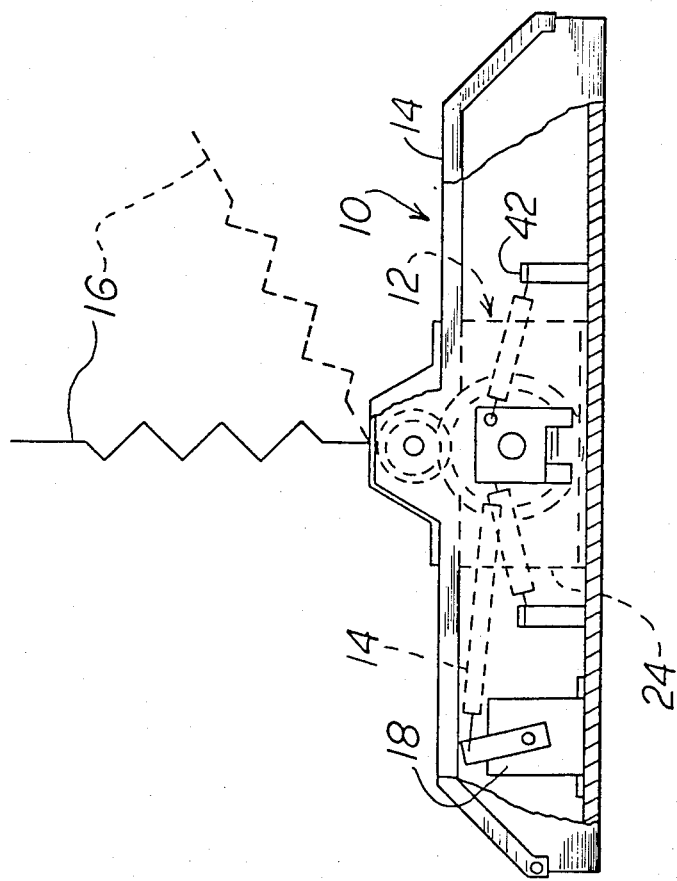
FIG. 1 is a side elevational view of a car counter unit in which is embodied a damping means constructed in accordance with the principles of the present invention, portions of the unit housing being broken away for purposes of clarity of depiction.
Figure 3:
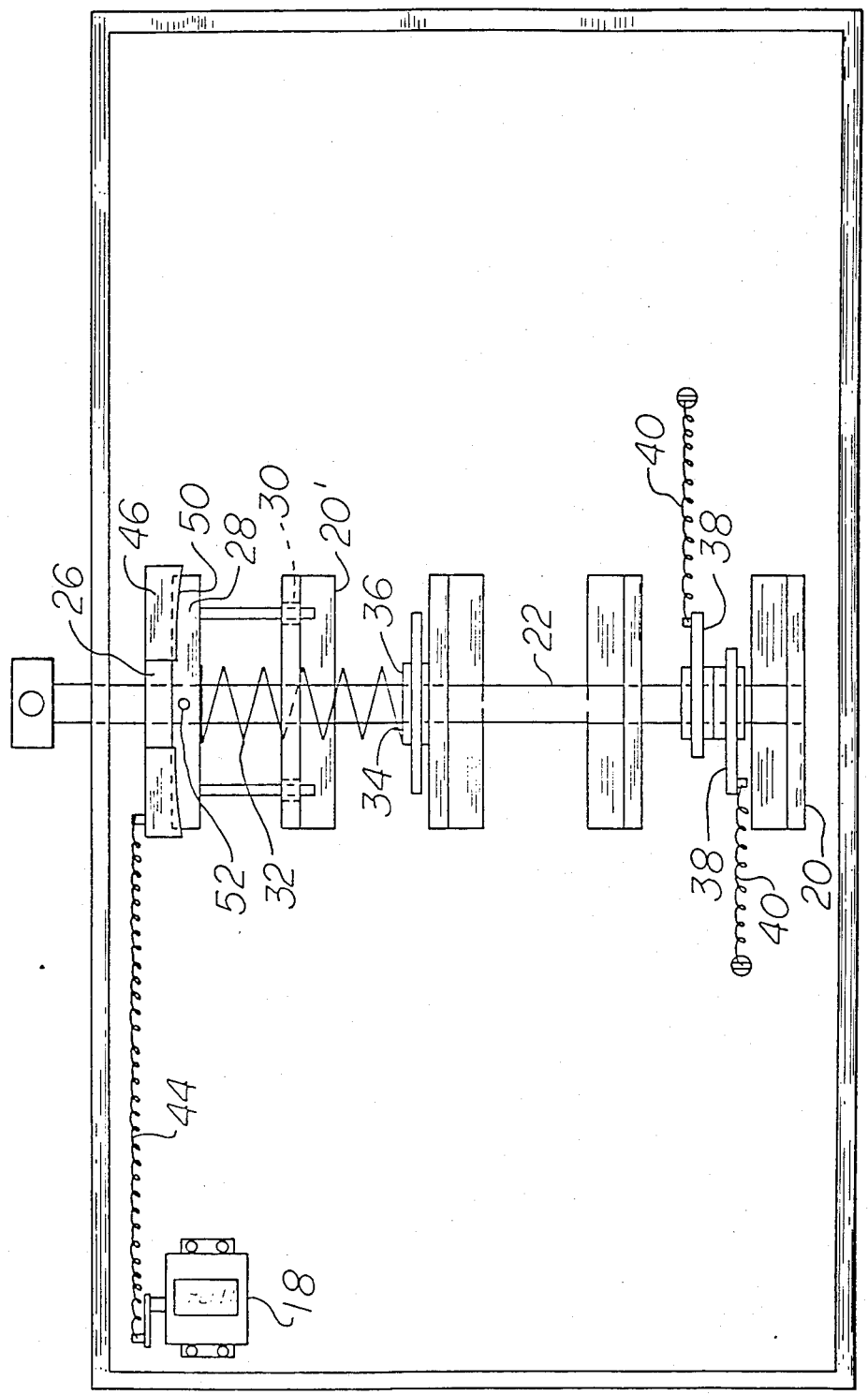
FIG. 3 is a top plan view of the type of damping means employed for the unit shown in FIGS. 1 and 2 as housed in its own casing with the upper part and encircling walls broken away to facilitate depiction of the damping means, the cams on the rotatable member being carried on the circumferential periphery thereof, the follower on the plate being a lug projecting from its circumferential periphery.

Referring now in detail to FIG. 3, the damping means 12 itself can be confined in box 24 which sits on the floor of casing 14 and is secured to the box by means of bracket standards 20 welded or otherwise fixed thereto. The standards mount shaft 22 which can extend beyond one side of the box for reception mounting of the barrier arm 16. Mounted on shaft 22 and fixed to rotate therewith is rotatable plate member 26 and disposed alongside in coaxial relationship therewith is a plate member 28, free to slide on shaft 22 but stopped from rotating with the shaft, the plate member 28 having pins thereon which are captive in slots 30 of standard 20' to prevent rotation of member 28. A compression spring 32 encloses shaft 22, is anchored at one end as at 34 against boss 36, extends through an opening in standard 20 and at its opposite end engages plate member 28 to urge it against rotatable plate member 26. The juxtaposed faces of rotatable member 26 and non-rotatable plate member 28 consitute friction surfaces, the said two members preferably being made of cast iron and having friction face surfaces finishes of character suited to produce the requisite damping effect and being readily determined for a given and desired effect, the finish of the depicted plates being, e.g., of 63 micro inch finish.

On the end of shaft 22 opposite the rotatable member mounting, the shaft carries arms 38 which in turn are connected with tension springs 40 anchored to the box floor as at 42, the springs being used to impart return travel to the barrier arm or wand when the load which rotated it in either left or right direction is released, e.g., after a vehicle has passed through the lane. A counter mechanism 18 is connected by a link member 44 to the rotatable member 26 so that upon rotation of same as caused by depression of barrier arm 16, the counter is actuated to record the event. Only one counter mechanism is shown for counting when the barrier arm is moved to the right in FIG. 3, but it is apparent that a second mechanism could be provided for recording barrier movement to the left.

Figure 4A:
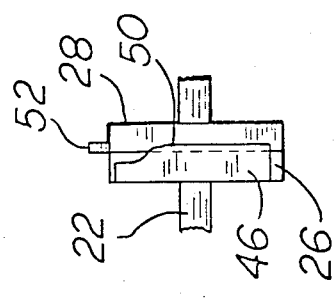
FIGS. 4a and 4b show respectively, front elevational views of the rotatable member when in its normally stopped position and in a moved position, there being companion end views.
Figure 4B:
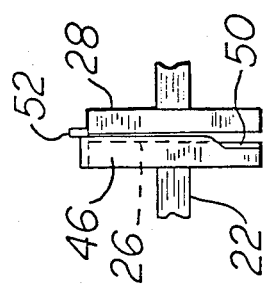
Figure 4A:
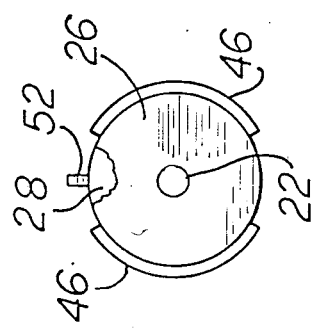
Figure 4B:
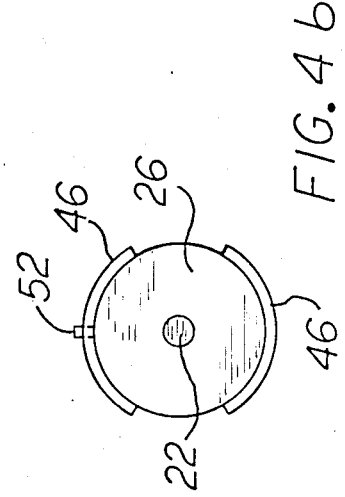

Rotatable member 26 which preferably is a disc, is provided at its circumferential periphery with a pair of symmetrically disposed cams 46 which as seen in FIGS. 4a and 4b extend around the periphery to the extent of about 130°–150°. Additionally, the cams extend portions thereof axially from member 26 in embrace over the plate member 28, the extent being along an axially lengthing reach defining camming edges 50. Plate member 28 has a lug 52 at the top thereof which serves as a cam follower.

The manner of operation of the damping means will be set forth briefly and with continuing reference to FIGS. 3, 4a, 4b, 4a' and 4b'. Rotatable member 26 is shown in its normally stopped position in FIGS. 3, 4a and 4a'. When the barrier 16 is pushed to the right in FIG. 3 and thus depressed, the rotatable member 26 will be rotatively displaced clockwise in FIG. 4a a certain distance of, e.g., about 75° to a moved position and accompanying that movement, the counter mechanism 18 will be actuated and the left side spring 40 tensioned. Further during the travel to moved position and for a certain short distance thereof from the normally stopped position, the friction faces of rotatable member 26 and plate member 28 will be in contact being held there by the constraining force of compression spring 32. On reaching that distance of rotative travel, the camming edge 50 of the left side cam 46 in FIG. 3 will engage the follower lug 52 on the plate member 28 and due to the widening character of the camming edge, overcome the urging of spring 32 to force the plate member 28 axially away of the rotatable member disengaging contact of the friction faces of these members as seen in FIG. 4b'. When the force applied to the barrier arm 16 is released, the spring 40 will rapidly counter rotate the shaft 22 and hence rotatable member 26 to return it to its normally stopped position. During the major part of this rapid return travel, the friction faces of members 26 and 28 are not in contact. However, on reaching said certain short distance before normally stopped position, the cam 46 will disengage from lug 52 allowing spring 32 to force the friction faces into contact. This friction faces contact produces a magnitude of friction sufficient to absorb the rotative momentum in rotatable member 26 and cause it to completely stop at or closely proximate its normally stopped position without override therefrom.

Figure 6:
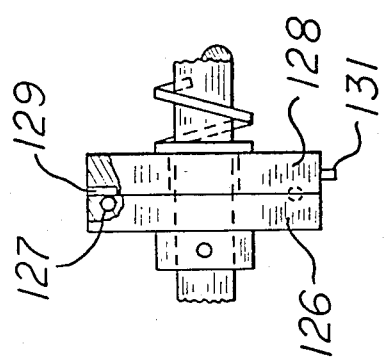
FIG. 6 is a fragmentary elevational view of the FIG. 5 embodiment with parts broken away depicting the manner in which the ball member locates in the detent recess of the plate member when the rotatable member is in normally stopped position.
Figure 5:
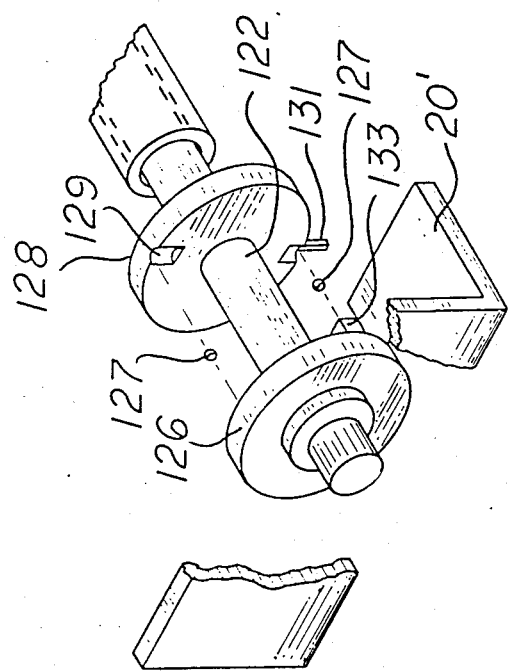
FIG. 5 is fragmentary exploded perspective view of damping means in which a ball member is captively connected to the friction face of the rotatable member and used to urge the plate member out of contact therewith when the rotatable member is in a moved position.

FIGS. 5 and 6 depict a modification in the damping means already described. In such modification instead of using peripherial cams on the rotatable member, the rotatable member 126 carries captively in the friction face thereof, a ball member 127 which in normally stopped position of member 126 locates in the groove detent 129 of non-rotatable member 128. When member 126 is rotated from its normally stopped position, the ball member 127 rides up out of the groove 129 and engages the friction face of plate member 128 to force it away from the like face of plate member 126. Also the axially displaceable plate member 128 is provided at the bottom with a projection 131 which locates in base groove 133 to prevent the plate member from rotating but yet allowing it to slide on shaft 122.

While the rotatable and non-rotatable friction producing plate members are described herein as preferably being of cast iron, it should be understood that they could be made of other forms of material, for example, of sintered composition. The important consideration is that the material be one which when the plates are rubbed together from minute particulates rather than simply having the plates assume a polished condition. Further, the machined finish condition of the plate faces should approximate that which would come about after normal wear during service, otherwise, the damping or braking action produced by the plate contact could change with use.

Figure 8:
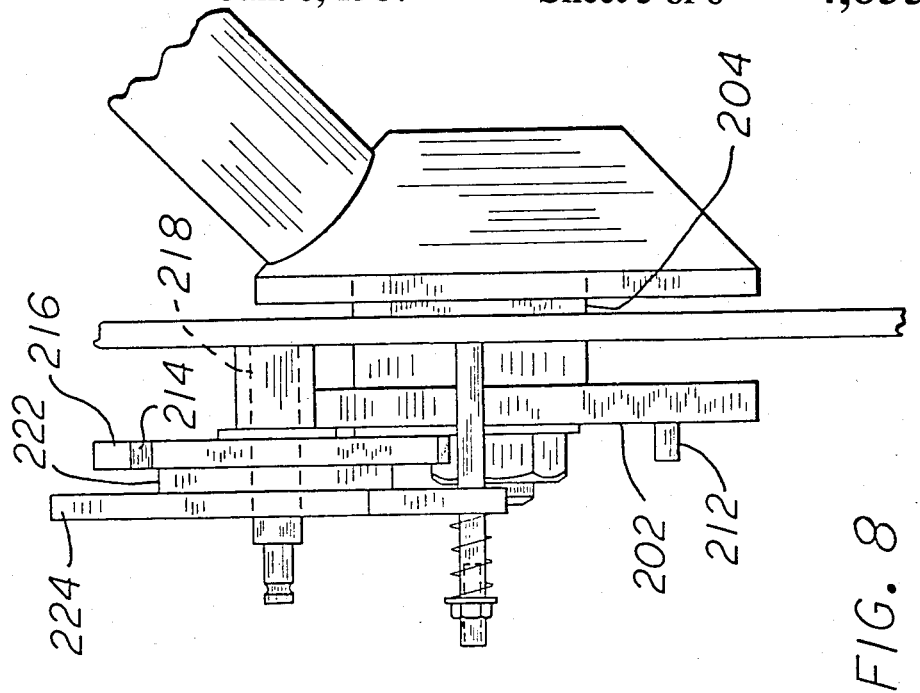
FIG. 8 is a side view of FIG. 7.
Figure 7:
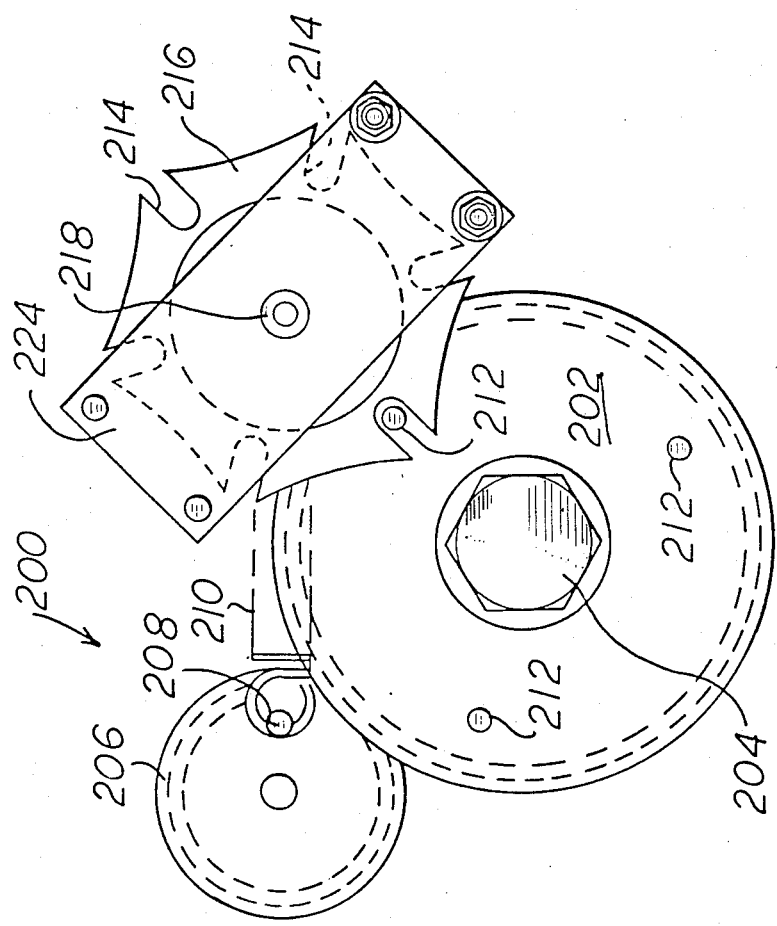
FIG. 7 is a plan view of another form of damping means employed for stopping a rotatable member at precise stopped positions and in which the rotatable member is intended to be rotated in equal stepped increments.

FIGS. 7 and 8 depict a further form of damping means 200 which is intended for effecting damping of a rotatable member rotating in stepped increments of movement and specifically employed to stop the rotatable member precisely at its incremental normally stopped position. The damping means 200 includes a rotatable member 202 which is a gear mounted on shaft 204. Connected to shaft 204 is a device, e.g., a barrier with force can be applied to cause rotation of member 202. Member 202 is in mesh with a centering gear 206, the centering gear 206 having a pin 208 around which is hooked one end of a spring 210. Member 202 also carries on one face thereof three pins 212 which are intended to intermittently engage in the slots 214 of a Geneva gear 216 mounted on shaft 218. Mounted on one face of Geneva gear 216 rotatable therewith is a disc 222 having a friction face in contact with a friction face of fixed plate 224, the friction faces being urged into contact by springs 230 only one of which is shown. The arrangement thus described is intended to provide incremental stopped 120° rotation of member 202 and effective damping to stop the member 202 in a normally stop position without override at the end of the 120° travel.

In the operation of damping means 200, and assuming the barrier has force applied thereto so as to start rotating member 202, the said member which is shown in FIG. 7 in a normally stopped position will start rotating, e.g., clockwise and in so doing the pin 212 engaged in slot 214 of the Geneva gear 216 will rotate the Geneva gear and the disc 222. During the time member 202 is rotating, centering gear 206 will rotate counterclockwise and spring 210 will become tensioned. After a certain rotation travel of member 202, pin 212 will ride out of slot 214 and drive of the Geneva gear and disc 222 ceases, placing these components at rest due to the high frictional contact between disc 222 and plate member 224. Continued application of the applied force to the barrier continues rotation of member 202 until such time as pin 208 on the centering gear 206 has undergone travel of 180° or more. During this continued rotation of member 202 the next pin 212 is riding toward engagement with the next slot 214 so that they cooperatively engage with additional travel of member 202, which additional travel is now produced by the return movement of centering spring 210, and causing gear 206 to rotate the member 202. As soon as the next pin 212 has engaged in the next slot 214, the Geneva gear and disc 222 start to rotate but the frictional force between disc 222 and plate member 224 make such rotation short lived as it absorbs the rotative momentum of member 202 and brings all components to stopped condition with the member 202 being stopped after it has travelled a total of 120°. During this last travel, the effect of spring 210 is dissipated and it also come to rest, centering gear 206 having returned to the position shown in FIG. 7.

Figure 9:
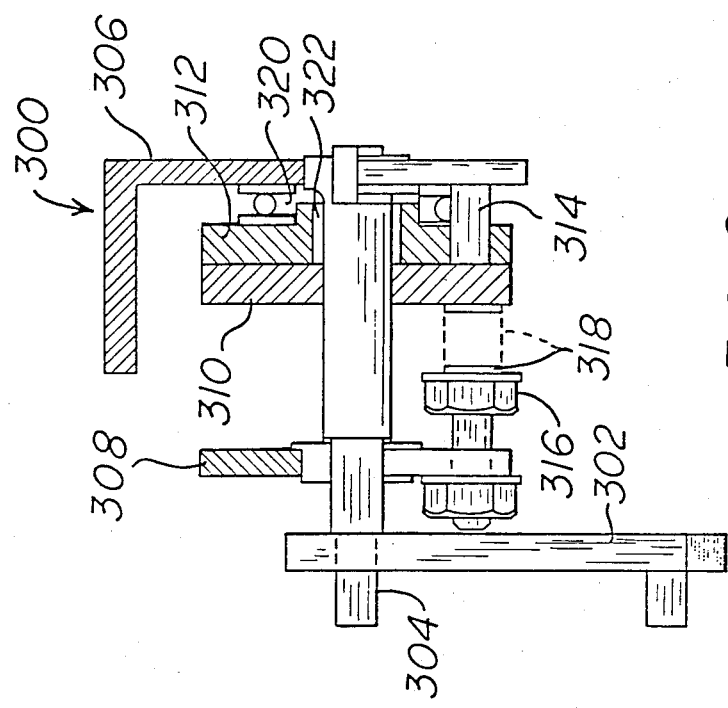
FIG. 9 is an elevational view partly in section of an embodiment of damping device in which a clutch is employed for selectively coupling the rotatable damping plate member to a shaft in one direction of shaft movement to effect damping frictional contact of said rotatable plate member with a fixed or non-rotatable plate member, the clutch being passive when the shaft is rotated in an opposite direction.
Figure 10:
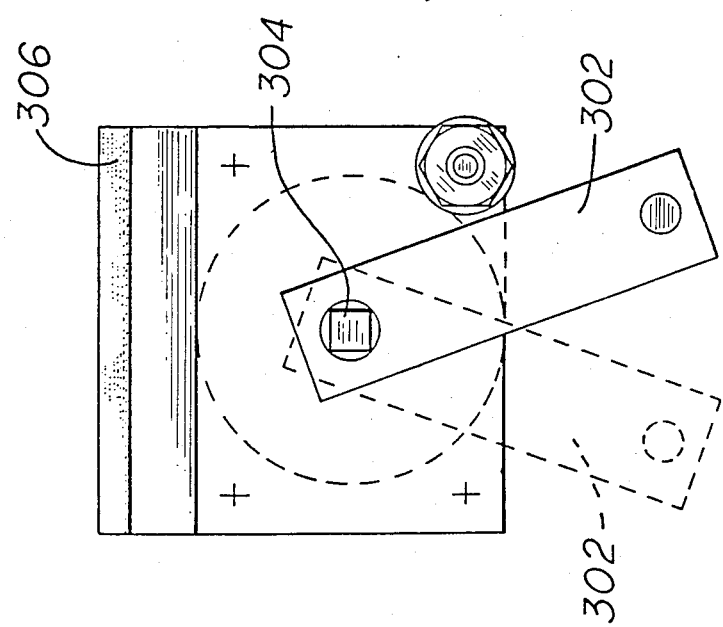
FIG. 10 is an end view of FIG. 9.

FIGS. 9 and 10 shown another form of damping device 300 which can for example, be used for damping the motion of a plural arm rotor of a passenger entry unit to a stadium, transit system etc. Movement of the entry unit (not shown but of a well known type) to be damped is transmitted by operating linkage (not shown) connected with arm 302 fixed to a shaft 304, the shaft in turn being supported on mounting bracket 306, the shaft also passing through a bearing plate 308. A non-rotatable plate member 310 is loosely mounted on shaft 304 as is a rotatable plate member 312, the two plate members being in juxtaposed face-to-face relationship with plate member 310 being stopped from rotating by passage therethrough of a bolt 314, nut 316 on the bolt being used to compress spring 318 and thereby force plate 310 into good frictional contact with plate 312. A thrust bearing 320 interposes plate 312 and bracket 306. Plate 312 is mounted to shaft 304 on a roller clutch unit 322 which clutch unit operates to rotatively drive the plate member 312 from shaft 304 only when the shaft is rotated in one direction. When the shaft rotates in an opposite direction, the clutch is passive and plate 312 does not rotate. In operation and with reference to FIG. 10, arm 302 is in the normally stopped position (full lines) when the entry unit is at rest. As soon as a person starts passage through the entry unit and thus the entry unit mechanism starts to move to moved position, the arm 302 will follow that entry unit movement until arm 302 reaches its maximum travel position (dashed lines) from whence it shall start return travel to its normally stopped position (corresponding to the moment of the entry unit to a normally stopped position). It is during this return travel that the damping mechanism must be activated. Clutch unit 322 as noted above is passive during clockwise travel of arm 302. However, during the return travel counterclockwise, clutch 322 couples plate member 312 to shaft 304 and hence the rotative movement of the plate member 312 in contact with plate member 310 applies the required damping effect to bring arm 302 (and hence the entry unit rotor) to a smooth stop at a normally stopped position thereof.

While there is above discussed only some embodiments of the damping means of the present invention, it will be appreciated that various modifications can be made within the scope of the disclosed invention.

What is claimed is:

1. In a device including a member rotatable incrementally between succeeding spaced normally stopped positions thereof, damping means operable to hold said member at a normally stopped position but yieldable to a certain magnitude of force acting to rotate said member from said normally stopped position to a succeeding stopped position, said damping means further being operable upon release of said certain force to apply damping force to said member to bring it to a stopped position at the said succeeding stopped position, said damping means including
   a fixed plate member,
   a rotatable plate member in face-to-face juxtaposition with said fixed plate member,
   bias means urging said two plate members into frictional face-to-face contact,
   selective coupled cooperating drive means coupled to said incrementally rotatable member and said rotatable plate member, said cooperating drive means being coupled only during initial and terminal portions of the movement of said incrementally rotatable member between said normally stopped position and said succeeding stopped position, the frictional contact between said two plate members being sufficient to absorb the movement momentum of said incrementally rotatable member as it arrives at said succeeding stopped position and maintain it held thereat.

2. The device of claim 1 in which said selectively coupled drive means comprises a Geneva gear having slots therein connected to said rotatable plate member, and pins carried on said incrementally rotatable member.

* * * * *